(12) United States Patent
Vorbach

(10) Patent No.: US 7,577,822 B2
(45) Date of Patent: Aug. 18, 2009

(54) PARALLEL TASK OPERATION IN PROCESSOR AND RECONFIGURABLE COPROCESSOR CONFIGURED BASED ON INFORMATION IN LINK LIST INCLUDING TERMINATION INFORMATION FOR SYNCHRONIZATION

(75) Inventor: Martin Vorbach, Munich (DE)

(73) Assignee: Pact XPP Technologies AG, Munich (DE)

( * ) Notice: Subject to any disclaimer, the term of this patent is extended or adjusted under 35 U.S.C. 154(b) by 0 days.

(21) Appl. No.: 10/487,681

(22) PCT Filed: Sep. 9, 2002

(86) PCT No.: PCT/EP02/10084

§ 371 (c)(1),
(2), (4) Date: Aug. 5, 2004

(87) PCT Pub. No.: WO03/025770

PCT Pub. Date: Mar. 27, 2003

(65) Prior Publication Data

US 2004/0249880 A1 Dec. 9, 2004

(30) Foreign Application Priority Data

Dec. 14, 2001 (EP) .................................. 01129923
Feb. 18, 2002 (DE) ................................ 102 06 856

(51) Int. Cl.
*G06F 15/16* (2006.01)
(52) U.S. Cl. .......................................... 712/34; 712/37
(58) Field of Classification Search ....................... None
See application file for complete search history.

(56) References Cited

U.S. PATENT DOCUMENTS 3,681,578 A 8/1972 Stevens
3,855,577 A 12/1974 Vandierendonck
(Continued)

FOREIGN PATENT DOCUMENTS

DE 42 21 278 1/1994
(Continued)

OTHER PUBLICATIONS

John R. Hauser et al. "Garp: A MIPS Processor with a Reconfigurable Coprocessor", 1997, pp. 12-21, IEEE.
(Continued)

*Primary Examiner*—Kenneth S Kim
(74) *Attorney, Agent, or Firm*—Kenyon & Kenyon LLP

(57) ABSTRACT

A reconfigurable processor (VPU) is designed for a technical environment having a standard processor (CPU) which has, for example, a DSP, RISC, CISC processor or a (micro) controller. The VPU and the CPU are coupled to form a processor-coprocessor arrangement. For the coupling, the CPU executes a program and provides, during the execution, configuration related information, in accordance with the configuration related information; a configuration load unit is instructed to load a configuration into the VPU and responsively loads the configuration into the VPU; the VPU processes data in accordance with the configuration; the CPU parallelly processes data by continuing the program execution if it can be continued without waiting for output of the VPU's data processing or, otherwise, executing a different program; and synchronization signals are transferred between the CPU and the VPU to synchronize the data processing of the VPU and CPU.

8 Claims, 3 Drawing Sheets

U.S. PATENT DOCUMENTS

| | | | |
|---|---|---|---|
| 4,233,667 A | 11/1980 | Devine et al. |
| 4,414,547 A | 11/1983 | Knapp et al. |
| 4,498,134 A | 2/1985 | Hansen et al. |
| 4,498,172 A | 2/1985 | Bhavsar |
| 4,566,102 A | 1/1986 | Hefner |
| 4,590,583 A | 5/1986 | Miller |
| 4,591,979 A | 5/1986 | Iwashita |
| 4,663,706 A | 5/1987 | Allen et al. |
| 4,667,190 A | 5/1987 | Fant et al. |
| 4,682,284 A | 7/1987 | Schrofer |
| 4,706,216 A | 11/1987 | Carter |
| 4,720,778 A | 1/1988 | Hall et al. |
| 4,720,780 A | 1/1988 | Dolecek |
| 4,739,474 A | 4/1988 | Holsztynski |
| 4,761,755 A | 8/1988 | Ardini et al. |
| 4,811,214 A | 3/1989 | Nosenchuck et al. |
| 4,852,043 A | 7/1989 | Guest |
| 4,852,048 A | 7/1989 | Morton |
| 4,860,201 A | 8/1989 | Stolfo et al. |
| 4,870,302 A | 9/1989 | Freeman |
| 4,882,687 A | 11/1989 | Gordon |
| 4,884,231 A | 11/1989 | Mor et al. |
| 4,891,810 A | 1/1990 | de Corlieu et al. |
| 4,901,268 A | 2/1990 | Judd |
| 4,910,665 A | 3/1990 | Mattheyses et al. |
| 4,918,440 A | 4/1990 | Furtek et al. |
| 4,967,340 A | 10/1990 | Dawes |
| 4,972,314 A | 11/1990 | Getzinger et al. |
| 5,010,401 A | 4/1991 | Murakami et al. |
| 5,014,193 A | 5/1991 | Garner et al. |
| 5,015,884 A | 5/1991 | Agrawal et al. |
| 5,021,947 A | 6/1991 | Campbell et al. |
| 5,023,775 A | 6/1991 | Poret |
| 5,034,914 A | 7/1991 | Osterlund |
| 5,041,924 A | 8/1991 | Blackborow et al. |
| 5,043,978 A | 8/1991 | Nagler et al. |
| 5,047,924 A | 9/1991 | Fujioka et al. |
| 5,065,308 A | 11/1991 | Evans |
| 5,072,178 A | 12/1991 | Matsumoto |
| 5,081,375 A | 1/1992 | Pickett et al. |
| 5,099,447 A | 3/1992 | Myszewski |
| 5,109,503 A | 4/1992 | Cruickshank et al. |
| 5,113,498 A | 5/1992 | Evan et al. |
| 5,115,510 A | 5/1992 | Okamoto et al. |
| 5,123,109 A | 6/1992 | Hillis |
| 5,128,559 A | 7/1992 | Steele |
| 5,142,469 A | 8/1992 | Weisenborn |
| 5,144,166 A | 9/1992 | Camarota et al. |
| 5,193,202 A | 3/1993 | Jackson et al. |
| 5,203,005 A | 4/1993 | Horst |
| 5,204,935 A | 4/1993 | Mihara et al. |
| 5,208,491 A | 5/1993 | Ebeling et al. |
| 5,212,716 A | 5/1993 | Ferraiolo et al. |
| 5,218,302 A | 6/1993 | Loewe et al. |
| 5,226,122 A | 7/1993 | Thayer et al. |
| RE34,363 E | 8/1993 | Freeman |
| 5,233,539 A | 8/1993 | Agrawal et al. |
| 5,237,686 A | 8/1993 | Asano et al. |
| 5,247,689 A | 9/1993 | Ewert |
| RE34,444 E | 11/1993 | Kaplinsky |
| 5,274,593 A | 12/1993 | Proebsting |
| 5,276,836 A | 1/1994 | Fukumaru et al. |
| 5,287,472 A | 2/1994 | Horst |
| 5,287,532 A | 2/1994 | Hunt |
| 5,301,284 A | 4/1994 | Estes et al. |
| 5,301,344 A | 4/1994 | Kolchinsky |
| 5,303,172 A | 4/1994 | Magar et al. |
| 5,311,079 A | 5/1994 | Ditlow et al. |
| 5,327,125 A | 7/1994 | Iwase et al. |
| 5,336,950 A | 8/1994 | Popli et al. |
| 5,343,406 A | 8/1994 | Freeman et al. |
| 5,347,639 A | 9/1994 | Rechtschaffen et al. |
| 5,349,193 A | 9/1994 | Mott et al. |
| 5,353,432 A | 10/1994 | Richek et al. |
| 5,361,373 A | 11/1994 | Gilson |
| 5,379,444 A | 1/1995 | Mumme |
| 5,392,437 A | 2/1995 | Matter et al. |
| 5,410,723 A | 4/1995 | Schmidt et al. |
| 5,412,795 A | 5/1995 | Larson |
| 5,418,952 A | 5/1995 | Morley et al. |
| 5,418,953 A | 5/1995 | Hunt et al. |
| 5,421,019 A | 5/1995 | Holsztynski et al. |
| 5,422,823 A | 6/1995 | Agrawal et al. |
| 5,425,036 A | 6/1995 | Liu et al. |
| 5,426,378 A | 6/1995 | Ong |
| 5,428,526 A | 6/1995 | Flood et al. |
| 5,430,687 A | 7/1995 | Hung et al. |
| 5,440,245 A | 8/1995 | Galbraith et al. |
| 5,440,538 A | 8/1995 | Olsen et al. |
| 5,442,790 A | 8/1995 | Nosenchuck |
| 5,444,394 A | 8/1995 | Watson et al. |
| 5,448,186 A | 9/1995 | Kawata |
| 5,455,525 A | 10/1995 | Ho et al. |
| 5,457,644 A | 10/1995 | McCollum |
| 5,465,375 A | 11/1995 | Thepaut et al. |
| 5,469,003 A | 11/1995 | Kean |
| 5,473,266 A | 12/1995 | Ahanin et al. |
| 5,473,267 A | 12/1995 | Stansfield |
| 5,475,583 A | 12/1995 | Bock et al. |
| 5,475,803 A | 12/1995 | Stearns et al. |
| 5,475,856 A | 12/1995 | Kogge |
| 5,483,620 A | 1/1996 | Pechanek et al. |
| 5,485,103 A | 1/1996 | Pedersen et al. |
| 5,485,104 A | 1/1996 | Agrawal et al. |
| 5,489,857 A | 2/1996 | Agrawal et al. |
| 5,491,353 A | 2/1996 | Kean |
| 5,493,239 A | 2/1996 | Zlotnick |
| 5,497,498 A | 3/1996 | Taylor |
| 5,506,998 A | 4/1996 | Kato et al. |
| 5,510,730 A | 4/1996 | El Gamal et al. |
| 5,511,173 A | 4/1996 | Yamaura et al. |
| 5,513,366 A | 4/1996 | Agarwal et al. |
| 5,521,837 A | 5/1996 | Frankle et al. |
| 5,522,083 A | 5/1996 | Gove et al. |
| 5,525,971 A | 6/1996 | Flynn |
| 5,530,873 A | 6/1996 | Takano |
| 5,530,946 A | 6/1996 | Bouvier et al. |
| 5,532,693 A | 7/1996 | Winters et al. |
| 5,532,957 A | 7/1996 | Malhi |
| 5,535,406 A | 7/1996 | Kolchinsky |
| 5,537,057 A | 7/1996 | Leong et al. |
| 5,537,580 A | 7/1996 | Giomi et al. |
| 5,537,601 A | 7/1996 | Kimura et al. |
| 5,541,530 A | 7/1996 | Cliff et al. |
| 5,544,336 A | 8/1996 | Kato et al. |
| 5,548,773 A | 8/1996 | Kemeny et al. |
| 5,550,782 A | 8/1996 | Cliff et al. |
| 5,555,434 A | 9/1996 | Carlstedt |
| 5,559,450 A | 9/1996 | Ngai et al. |
| 5,561,738 A | 10/1996 | Kinerk et al. |
| 5,570,040 A | 10/1996 | Lytle et al. |
| 5,574,930 A | 11/1996 | Halverson, Jr. et al. |
| 5,581,731 A | 12/1996 | King et al. |
| 5,583,450 A | 12/1996 | Trimberger et al. |
| 5,586,044 A | 12/1996 | Agrawal et al. |
| 5,587,921 A | 12/1996 | Agrawal et al. |
| 5,588,152 A | 12/1996 | Dapp et al. |
| 5,590,345 A | 12/1996 | Barker et al. |
| 5,590,348 A | 12/1996 | Phillips et al. |
| 5,596,742 A | 1/1997 | Agarwal et al. |
| 5,600,265 A | 2/1997 | El Gamal et al. |
| 5,600,845 A | 2/1997 | Gilson |
| 5,611,049 A | 3/1997 | Pitts |
| 5,617,547 A | 4/1997 | Feeney et al. |

| | | | | | | |
|---|---|---|---|---|---|---|
| 5,625,806 | A | 4/1997 | Kromer | 5,936,424 A | 8/1999 | Young et al. |
| 5,625,836 | A | 4/1997 | Barker et al. | 5,943,242 A | 8/1999 | Vorbach et al. |
| 5,634,131 | A | 5/1997 | Matter et al. | 5,956,518 A | 9/1999 | DeHon et al. |
| 5,646,544 | A | 7/1997 | Iadanza | 5,960,193 A | 9/1999 | Guttag et al. |
| 5,646,545 | A | 7/1997 | Trimberger et al. | 5,960,200 A | 9/1999 | Eager et al. |
| 5,649,176 | A | 7/1997 | Selvidge et al. | 5,966,143 A | 10/1999 | Breternitz, Jr. |
| 5,649,179 | A | 7/1997 | Steenstra et al. | 5,966,534 A | 10/1999 | Cooke et al. |
| 5,652,529 | A | 7/1997 | Gould et al. | 5,970,254 A | 10/1999 | Cooke et al. .................. 712/37 |
| 5,652,894 | A | 7/1997 | Hu et al. | 5,978,260 A | 11/1999 | Trimberger et al. |
| 5,655,069 | A | 8/1997 | Ogawara et al. | 5,978,583 A | 11/1999 | Ekanadham et al. |
| 5,655,124 | A | 8/1997 | Lin | 5,996,083 A | 11/1999 | Gupta et al. |
| 5,657,330 | A | 8/1997 | Matsumoto | 5,999,990 A | 12/1999 | Sharrit et al. |
| 5,659,797 | A | 8/1997 | Zandveld et al. | 6,003,143 A | 12/1999 | Kim et al. |
| 5,675,743 | A | 10/1997 | Mavity | 6,011,407 A | 1/2000 | New |
| 5,680,583 | A | 10/1997 | Kuijsten | 6,014,509 A | 1/2000 | Furtek et al. |
| 5,694,602 | A | 12/1997 | Smith | 6,020,758 A | 2/2000 | Patel et al. |
| 5,713,037 | A | 1/1998 | Wilkinson et al. | 6,020,760 A | 2/2000 | Sample et al. |
| 5,717,943 | A | 2/1998 | Barker et al. | 6,021,490 A | 2/2000 | Vorbach et al. |
| 5,732,209 | A | 3/1998 | Vigil et al. | 6,023,564 A | 2/2000 | Trimberger |
| 5,734,921 | A | 3/1998 | Dapp et al. | 6,023,742 A | 2/2000 | Ebeling et al. |
| 5,737,516 | A | 4/1998 | Circello et al. | 6,026,481 A | 2/2000 | New et al. |
| 5,737,565 | A | 4/1998 | Mayfield | 6,034,538 A | 3/2000 | Abramovici |
| 5,742,180 | A | 4/1998 | DeHon et al. | 6,035,371 A | 3/2000 | Magloire |
| 5,748,872 | A | 5/1998 | Norman | 6,038,650 A | 3/2000 | Vorbach et al. |
| 5,748,979 | A * | 5/1998 | Trimberger .................. 712/37 | 6,038,656 A | 3/2000 | Martin et al. |
| 5,752,035 | A | 5/1998 | Trimberger | 6,044,030 A | 3/2000 | Zheng et al. |
| 5,754,459 | A | 5/1998 | Telikepalli | 6,047,115 A | 4/2000 | Mohan et al. |
| 5,754,820 | A | 5/1998 | Yamagami | 6,049,222 A | 4/2000 | Lawman |
| 5,754,827 | A | 5/1998 | Barbier et al. | 6,052,773 A | 4/2000 | DeHon et al. |
| 5,754,871 | A | 5/1998 | Wilkinson et al. | 6,054,873 A | 4/2000 | Laramie |
| 5,760,602 | A | 6/1998 | Tan | 6,058,469 A | 5/2000 | Baxter |
| 5,761,484 | A | 6/1998 | Agarwal et al. | 6,077,315 A | 6/2000 | Greenbaum et al. |
| 5,773,994 | A | 6/1998 | Jones | 6,081,903 A | 6/2000 | Vorbach et al. |
| 5,778,439 | A | 7/1998 | Timberger et al. | 6,084,429 A | 7/2000 | Trimberger |
| 5,781,756 | A | 7/1998 | Hung | 6,085,317 A | 7/2000 | Smith |
| 5,784,636 | A | 7/1998 | Rupp | 6,086,628 A | 7/2000 | Dave et al. |
| 5,794,059 | A | 8/1998 | Barker et al. | 6,088,795 A | 7/2000 | Vorbach et al. |
| 5,794,062 | A | 8/1998 | Baxter | 6,092,174 A | 7/2000 | Roussakov |
| 5,801,547 | A | 9/1998 | Kean | 6,105,105 A * | 8/2000 | Trimberger ................. 711/103 |
| 5,801,715 | A | 9/1998 | Norman | 6,105,106 A | 8/2000 | Manning |
| 5,801,958 | A | 9/1998 | Dangelo et al. | 6,108,760 A | 8/2000 | Mirsky et al. |
| 5,802,290 | A | 9/1998 | Casselman | 6,119,181 A | 9/2000 | Vorbach et al. |
| 5,815,715 | A * | 9/1998 | Kuçukçakar .................. 717/141 | 6,122,719 A | 9/2000 | Mirsky et al. |
| 5,821,774 | A | 10/1998 | Veytsman et al. | 6,125,408 A | 9/2000 | McGee et al. |
| 5,828,229 | A | 10/1998 | Cliff et al. | 6,127,908 A | 10/2000 | Bozler et al. |
| 5,828,858 | A | 10/1998 | Athanas et al. | 6,134,166 A | 10/2000 | Lytle et al. |
| 5,831,448 | A | 11/1998 | Kean | 6,137,307 A | 10/2000 | Iwanczuk et al. |
| 5,838,165 | A | 11/1998 | Chatter | 6,150,837 A | 11/2000 | Beal et al. |
| 5,841,973 | A | 11/1998 | Kessler et al. | 6,150,839 A | 11/2000 | New et al. |
| 5,844,422 | A | 12/1998 | Trimberger et al. | 6,154,048 A | 11/2000 | Iwanczuk et al. |
| 5,844,888 | A | 12/1998 | Markkula, Jr. et al. | 6,154,049 A | 11/2000 | New |
| 5,848,238 | A | 12/1998 | Shimomura et al. | 6,157,214 A | 12/2000 | Marshall |
| 5,854,918 | A | 12/1998 | Baxter | 6,170,051 B1 | 1/2001 | Dowling |
| 5,857,097 | A | 1/1999 | Henzinger et al. | 6,172,520 B1 | 1/2001 | Lawman et al. |
| 5,859,544 | A | 1/1999 | Norman | 6,173,434 B1 | 1/2001 | Wirthlin et al. |
| 5,862,403 | A | 1/1999 | Kanai et al. | 6,185,256 B1 | 2/2001 | Saito et al. |
| 5,867,691 | A | 2/1999 | Shiraishi | 6,185,731 B1 | 2/2001 | Maeda et al. |
| 5,867,723 | A | 2/1999 | Peters et al. | 6,188,240 B1 | 2/2001 | Nakaya |
| 5,870,620 | A | 2/1999 | Kadosumi et al. | 6,198,304 B1 | 3/2001 | Sasaki |
| 5,884,075 | A | 3/1999 | Hester et al. | 6,201,406 B1 | 3/2001 | Iwanczuk et al. |
| 5,887,162 | A | 3/1999 | Williams et al. | 6,202,182 B1 | 3/2001 | Abramovici et al. |
| 5,887,165 | A | 3/1999 | Martel et al. | 6,204,687 B1 | 3/2001 | Schultz et al. |
| 5,889,533 | A | 3/1999 | Lee | 6,211,697 B1 | 4/2001 | Lien et al. |
| 5,889,982 | A | 3/1999 | Rodgers et al. | 6,212,650 B1 | 4/2001 | Guccione |
| 5,892,370 | A | 4/1999 | Eaton et al. | 6,215,326 B1 | 4/2001 | Jefferson et al. |
| 5,892,961 | A | 4/1999 | Trimberger | 6,216,223 B1 | 4/2001 | Revilla et al. |
| 5,892,962 | A | 4/1999 | Cloutier | 6,219,833 B1 | 4/2001 | Solomon et al. |
| 5,901,279 | A | 5/1999 | Davis, III | RE37,195 E | 5/2001 | Kean |
| 5,915,123 | A | 6/1999 | Mirsky et al. | 6,230,307 B1 | 5/2001 | Davis et al. |
| 5,924,119 | A | 7/1999 | Sindhu et al. | 6,240,502 B1 | 5/2001 | Panwar et al. |
| 5,926,638 | A | 7/1999 | Inoue | 6,243,808 B1 | 6/2001 | Wang |
| 5,933,023 | A | 8/1999 | Young | 6,252,792 B1 | 6/2001 | Marshall et al. |
| 5,933,642 | A | 8/1999 | Greenbaum et al. | 6,256,724 B1 * | 7/2001 | Hocevar et al. ................ 712/35 |

| | | |
|---|---|---|
| 6,260,179 B1 | 7/2001 | Ohsawa et al. |
| 6,262,908 B1 | 7/2001 | Marshall et al. |
| 6,263,430 B1 | 7/2001 | Trimberger et al. |
| 6,266,760 B1 | 7/2001 | DeHon et al. |
| 6,279,077 B1 | 8/2001 | Nasserbakht et al. |
| 6,282,627 B1 | 8/2001 | Wong et al. |
| 6,282,701 B1 | 8/2001 | Wygodny et al. |
| 6,285,624 B1 | 9/2001 | Chen |
| 6,286,134 B1 | 9/2001 | Click, Jr. et al. |
| 6,288,566 B1 | 9/2001 | Hanrahan et al. |
| 6,289,440 B1 | 9/2001 | Casselman |
| 6,298,472 B1 | 10/2001 | Phillips et al. |
| 6,301,706 B1 | 10/2001 | Maslennikov et al. |
| 6,311,200 B1 | 10/2001 | Hanrahan et al. |
| 6,311,265 B1 | 10/2001 | Beckerle et al. |
| 6,321,366 B1 | 11/2001 | Tseng et al. |
| 6,321,373 B1 | 11/2001 | Ekanadham et al. |
| 6,338,106 B1 | 1/2002 | Vorbach et al. |
| 6,341,318 B1 | 1/2002 | Dakhil |
| 6,347,346 B1 | 2/2002 | Taylor |
| 6,349,346 B1 | 2/2002 | Hanrahan et al. |
| 6,353,841 B1 | 3/2002 | Marshall et al. |
| 6,362,650 B1 | 3/2002 | New et al. |
| 6,370,596 B1 | 4/2002 | Dakhil |
| 6,373,779 B1 | 4/2002 | Pang et al. |
| 6,374,286 B1 | 4/2002 | Gee |
| 6,378,068 B1 | 4/2002 | Foster et al. |
| 6,381,624 B1 | 4/2002 | Colon-Bonet et al. |
| 6,389,379 B1 | 5/2002 | Lin et al. |
| 6,389,579 B1 | 5/2002 | Phillips et al. |
| 6,392,912 B1 | 5/2002 | Hanrahan et al. |
| 6,400,601 B1 | 6/2002 | Sudo et al. |
| 6,404,224 B1 | 6/2002 | Azegami et al. |
| 6,405,299 B1 | 6/2002 | Vorbach et al. |
| 6,421,808 B1 | 7/2002 | McGeer |
| 6,421,809 B1 | 7/2002 | Wuytack et al. |
| 6,421,817 B1 | 7/2002 | Mohan et al. |
| 6,425,054 B1 | 7/2002 | Nguyen |
| 6,425,068 B1 | 7/2002 | Vorbach |
| 6,427,156 B1 | 7/2002 | Chapman et al. |
| 6,430,309 B1 | 8/2002 | Pressman et al. |
| 6,434,642 B1 | 8/2002 | Camilleri et al. |
| 6,434,695 B1 | 8/2002 | Esfahani et al. |
| 6,434,699 B1 | 8/2002 | Jones et al. |
| 6,437,441 B1 | 8/2002 | Yamamoto |
| 6,438,747 B1 | 8/2002 | Schreiber et al. |
| 6,457,116 B1 | 9/2002 | Mirsky et al. |
| 6,476,634 B1 | 11/2002 | Bilski |
| 6,477,643 B1 | 11/2002 | Vorbach et al. |
| 6,480,937 B1 | 11/2002 | Vorbach et al. |
| 6,480,954 B2 | 11/2002 | Trimberger et al. |
| 6,487,709 B1 | 11/2002 | Keller et al. |
| 6,490,695 B1 | 12/2002 | Zagorski et al. |
| 6,496,971 B1 | 12/2002 | Lesea et al. |
| 6,504,398 B1 | 1/2003 | Lien et al. |
| 6,507,947 B1 | 1/2003 | Schreiber et al. |
| 6,513,077 B2 | 1/2003 | Vorbach et al. |
| 6,516,382 B2 | 2/2003 | Manning |
| 6,518,787 B1 | 2/2003 | Allegrucci et al. |
| 6,519,674 B1 | 2/2003 | Lam et al. |
| 6,523,107 B1 | 2/2003 | Stansfield et al. |
| 6,525,678 B1 * | 2/2003 | Veenstra et al. ............... 341/55 |
| 6,526,520 B1 | 2/2003 | Vorbach et al. |
| 6,538,468 B1 | 3/2003 | Moore |
| 6,539,415 B1 * | 3/2003 | Mercs ........................ 718/104 |
| 6,539,438 B1 | 3/2003 | Ledzius et al. |
| 6,539,477 B1 | 3/2003 | Seawright |
| 6,542,394 B2 | 4/2003 | Marshall et al. |
| 6,542,844 B1 | 4/2003 | Hanna |
| 6,542,998 B1 | 4/2003 | Vorbach |
| 6,553,395 B2 | 4/2003 | Marshall et al. |
| 6,567,834 B1 | 5/2003 | Marshall et al. |
| 6,571,381 B1 | 5/2003 | Vorbach et al. |
| 6,587,939 B1 | 7/2003 | Takano |
| 6,631,487 B1 | 10/2003 | Abramovici et al. |
| 6,633,181 B1 | 10/2003 | Rupp |
| 6,657,457 B1 | 12/2003 | Hanrahan et al. |
| 6,658,564 B1 | 12/2003 | Smith et al. |
| 6,687,788 B2 | 2/2004 | Vorbach et al. |
| 6,697,979 B1 | 2/2004 | Vorbach et al. |
| 6,704,816 B1 | 3/2004 | Burke |
| 6,708,325 B2 | 3/2004 | Cooke et al. |
| 6,717,436 B2 | 4/2004 | Kress et al. |
| 6,721,830 B2 | 4/2004 | Vorbach et al. |
| 6,728,871 B1 | 4/2004 | Vorbach et al. |
| 6,754,805 B1 | 6/2004 | Juan |
| 6,757,847 B1 | 6/2004 | Farkash et al. |
| 6,757,892 B1 | 6/2004 | Gokhale et al. |
| 6,782,445 B1 | 8/2004 | Olgiati et al. |
| 6,785,826 B1 | 8/2004 | Durham et al. |
| 6,802,026 B1 | 10/2004 | Patterson et al. |
| 6,803,787 B1 | 10/2004 | Wicker, Jr. |
| 6,820,188 B2 | 11/2004 | Stansfield et al. |
| 6,829,697 B1 * | 12/2004 | Davis et al. ................... 712/21 |
| 6,847,370 B2 | 1/2005 | Baldwin et al. |
| 6,868,476 B2 | 3/2005 | Rosenbluth et al. |
| 6,871,341 B1 | 3/2005 | Shyr |
| 6,874,108 B1 | 3/2005 | Abramovici et al. |
| 6,886,092 B1 * | 4/2005 | Douglass et al. .............. 712/37 |
| 6,901,502 B2 * | 5/2005 | Yano et al. ................... 712/37 |
| 6,928,523 B2 * | 8/2005 | Yamada ..................... 711/147 |
| 6,961,924 B2 | 11/2005 | Bates et al. |
| 6,977,649 B1 | 12/2005 | Baldwin et al. |
| 7,000,161 B1 | 2/2006 | Allen et al. |
| 7,007,096 B1 | 2/2006 | Lisitsa et al. |
| 7,010,687 B2 | 3/2006 | Ichimura |
| 7,038,952 B1 | 5/2006 | Zack et al. |
| 7,210,129 B2 | 4/2007 | May et al. |
| 7,216,204 B2 | 5/2007 | Rosenbluth et al. |
| 7,237,087 B2 | 6/2007 | Vorbach et al. |
| 7,249,351 B1 | 7/2007 | Songer et al. |
| 7,254,649 B2 | 8/2007 | Subramanian et al. |
| 7,340,596 B1 | 3/2008 | Crosland et al. |
| 7,350,178 B1 | 3/2008 | Crosland et al. |
| 2001/0001860 A1 | 5/2001 | Bieu |
| 2001/0010074 A1 | 7/2001 | Nishihara et al. |
| 2001/0018733 A1 | 8/2001 | Fujii et al. |
| 2001/0032305 A1 * | 10/2001 | Barry ......................... 712/34 |
| 2002/0013861 A1 | 1/2002 | Adiletta et al. |
| 2002/0038414 A1 | 3/2002 | Taylor |
| 2002/0045952 A1 | 4/2002 | Blemel |
| 2002/0083308 A1 | 6/2002 | Pereira et al. |
| 2002/0103839 A1 | 8/2002 | Ozawa |
| 2002/0124238 A1 | 9/2002 | Metzgen |
| 2002/0138716 A1 | 9/2002 | Master et al. |
| 2002/0143505 A1 | 10/2002 | Drusinsky |
| 2002/0144229 A1 | 10/2002 | Hanrahan |
| 2002/0165886 A1 | 11/2002 | Lam |
| 2003/0001615 A1 | 1/2003 | Sueyoshi et al. |
| 2003/0014743 A1 | 1/2003 | Cooke et al. |
| 2003/0046607 A1 | 3/2003 | May et al. |
| 2003/0052711 A1 | 3/2003 | Taylor |
| 2003/0055861 A1 | 3/2003 | Lai et al. |
| 2003/0056085 A1 | 3/2003 | Vorbach |
| 2003/0056091 A1 | 3/2003 | Greenberg |
| 2003/0056202 A1 | 3/2003 | May et al. |
| 2003/0061542 A1 | 3/2003 | Bates et al. |
| 2003/0062922 A1 | 4/2003 | Douglass et al. |
| 2003/0086300 A1 * | 5/2003 | Noyes et al. ........... 365/189.01 |
| 2003/0093662 A1 | 5/2003 | Vorbach et al. |
| 2003/0097513 A1 | 5/2003 | Vorbach et al. |
| 2003/0123579 A1 | 7/2003 | Safavi et al. |
| 2003/0135686 A1 | 7/2003 | Vorbach et al. |
| 2003/0192032 A1 | 10/2003 | Andrade et al. |
| 2004/0015899 A1 | 1/2004 | May et al. |
| 2004/0025005 A1 | 2/2004 | Vorbach et al. |

| | | | |
|---|---|---|---|
| 2004/0168099 A1 | 8/2004 | Vorbach et al. |
| 2004/0199688 A1 | 10/2004 | Vorbach et al. |
| 2005/0066213 A1 | 3/2005 | Vorbach et al. |
| 2005/0144210 A1 | 6/2005 | Simkins et al. |
| 2005/0144212 A1 | 6/2005 | Simkins et al. |
| 2005/0144215 A1 | 6/2005 | Simkins et al. |
| 2006/0230094 A1 | 10/2006 | Simkins et al. |
| 2006/0230096 A1 | 10/2006 | Thendean et al. |

FOREIGN PATENT DOCUMENTS

| | | |
|---|---|---|
| DE | 44 16 881 | 11/1994 |
| DE | 38 55 673 | 11/1996 |
| DE | 196 51 075 | 6/1998 |
| DE | 196 54 593 | 7/1998 |
| DE | 196 54 595 | 7/1998 |
| DE | 196 54 846 | 7/1998 |
| DE | 197 04 044 | 8/1998 |
| DE | 197 04 728 | 8/1998 |
| DE | 197 04 742 | 9/1998 |
| DE | 198 22 776 | 3/1999 |
| DE | 198 07 872 | 8/1999 |
| DE | 198 61 088 | 2/2000 |
| DE | 199 26 538 | 12/2000 |
| DE | 100 28 397 | 12/2001 |
| DE | 100 36 627 | 2/2002 |
| DE | 101 29 237 | 4/2002 |
| DE | 102 04 044 | 8/2003 |
| EP | 0 208 457 | 1/1987 |
| EP | 0 221 360 | 5/1987 |
| EP | 0 398 552 | 11/1990 |
| EP | 0 428 327 | 5/1991 |
| EP | 0 463 721 | 1/1992 |
| EP | 0 477 809 | 4/1992 |
| EP | 0 485 690 | 5/1992 |
| EP | 0 497 029 | 8/1992 |
| EP | 0 539 595 | 5/1993 |
| EP | 0 628 917 | 12/1994 |
| EP | 0 678 985 | 10/1995 |
| EP | 0 686 915 | 12/1995 |
| EP | 0 707 269 | 4/1996 |
| EP | 0 726 532 | 8/1996 |
| EP | 0 735 685 | 10/1996 |
| EP | 0 746 106 | 12/1996 |
| EP | 0 748 051 | 12/1996 |
| EP | 0 926 594 | 6/1999 |
| EP | 1 061 439 | 12/2000 |
| EP | 1 115 204 | 7/2001 |
| EP | 1 146 432 | 10/2001 |
| EP | 0 696 001 | 12/2001 |
| EP | 1 669 885 | 6/2006 |
| FR | 2 752 466 | 2/1998 |
| GB | 2 304 438 | 3/1997 |
| JP | 58-58672 | 4/1983 |
| JP | 2-130023 | 5/1990 |
| JP | 2-226423 | 9/1990 |
| JP | 5-276007 | 10/1993 |
| JP | 6-266605 | 9/1994 |
| JP | 7-154242 | 6/1995 |
| JP | 8-148989 | 6/1995 |
| JP | 8-44581 | 2/1996 |
| JP | 08069447 | 3/1996 |
| JP | 8-102492 | 4/1996 |
| JP | 8-221164 | 8/1996 |
| JP | 8-250685 | 9/1996 |
| JP | 9-27745 | 1/1997 |
| JP | 11-307725 | 11/1999 |
| JP | 2000-076066 | 3/2000 |
| JP | 2000-181566 | 6/2000 |
| JP | 2000-201066 | 7/2000 |
| JP | 2000-311156 | 11/2000 |
| JP | 2001-500682 | 1/2001 |
| JP | 05-509184 | 12/2003 |
| WO | WO90/04835 | 5/1990 |
| WO | WO90/11648 | 10/1990 |
| WO | WO92/01987 | 2/1992 |
| WO | WO93/11503 | 6/1993 |
| WO | WO 94/06077 | 3/1994 |
| WO | WO94/08399 | 4/1994 |
| WO | WO95/26001 | 9/1995 |
| WO | WO98/10517 | 3/1998 |
| WO | WO98/26356 | 6/1998 |
| WO | WO98/28697 | 7/1998 |
| WO | WO98/29952 | 7/1998 |
| WO | WO98/31102 | 7/1998 |
| WO | WO98/35294 | 8/1998 |
| WO | WO98/35299 | 8/1998 |
| WO | WO99/00731 | 1/1999 |
| WO | WO99/00739 | 1/1999 |
| WO | WO99/12111 | 3/1999 |
| WO | WO99/32975 | 7/1999 |
| WO | WO99/40522 | 8/1999 |
| WO | WO99/44120 | 9/1999 |
| WO | WO99/44147 | 9/1999 |
| WO | WO00/17771 | 3/2000 |
| WO | WO00/38087 | 6/2000 |
| WO | 00/45282 | 8/2000 |
| WO | WO00/49496 | 8/2000 |
| WO | WO00/77652 | 12/2000 |
| WO | WO01/55917 | 8/2001 |
| WO | WO02/13000 | 2/2002 |
| WO | WO02/29600 | 4/2002 |
| WO | WO02/50665 | 6/2002 |
| WO | WO02/071196 | 9/2002 |
| WO | WO02/071248 | 9/2002 |
| WO | WO02/071249 | 9/2002 |
| WO | WO02/103532 | 12/2002 |
| WO | WO03/017095 | 2/2003 |
| WO | WO03/023616 | 3/2003 |
| WO | WO03/025781 | 3/2003 |
| WO | WO03/036507 | 5/2003 |
| WO | WO2004/053718 | 6/2004 |
| WO | WO2004/114128 | 12/2004 |
| WO | WO2005/045692 | 5/2005 |

OTHER PUBLICATIONS

Jörg Donandt, "Improving Response time of Programmable Logic Controllers by Use of a Boolean Coprocessor", 1989, pp. 167-169, IEEE.

Alexanre F. Tenca et al., "A Variable Long-Precision Arithmetic Unit Design for Reconfigurable Coprocessor Architectures", 1998, pp. 216-225, IEEE.

Andreas Koch et al., "Practical Experiences with the SPARXIL Co-Processor", 1997, pp. 394-398, IEEE.

Abnous, A., et al., "The Pleiades Architecture," Chapter I of *The Application of Programmable DSPs in Mobile Communications*, A. Gatherer and A. Auslander, Ed., Wiley, 2002, pp. 1-33.

Ade, et al., "Minimum Memory Buffers in DSP Applications," Electronics Letters, vol. 30, No. 6, Mar. 17, 1994, pp. 469-471.

Alippi, et al., "Determining the Optimum Extended Instruction Set Architecture for Application Specific Reconfigurable VLIW CPUs," IEEE, 2001, pp. 50-56.

Arabi, et al., "PLD Integrates Dedicated High-speed Data Buffering, Complex State machine, and Fast Decode Array," conference record on WESCON '93, Sep. 28, 1993, pp. 432-436.

Athanas, "A Functional Reconfigurable Architecture and Compiler for Adoptive Computing," IEEE, pp. 49-55.

Athanas, et al., "An Adaptive Hardware Machine Architecture and Compiler for Dynamic Processor Reconfigutation," IEEE, Laboratory for Engineering man/Machine Systems Division of Engineering, Box D, Brown University, Providence, Rhode Island, 1991, pp. 397-400.

Baumgarte, V. et al., PACT XPP "A Self-reconfigurable Data Processing Architecture," PACT Info. GMBH, Munchen Germany, 2001, 7 pages.

Beck et al., "From control flow to data flow," TR 89-1050, Oct. 1989, Dept. of Computer Science, Cornell University, Ithaca, NY, pp. 1-25.

Becker, J. et al., "Parallelization in Co-compilation for Configurable Accelerators—a Host/accelerator Partitioning Compilation Method," Poceedings of Asia and South Pacific Design Automation Conference, Yokohama, Japan, Feb. 10-13, 1998, 11 pages.

Bittner, "Wormhole Run-time Reconfiguration: Conceptualization and VLSI Design of a High Performance Computing System," *Dissertation*, Jan. 23, 1997, pp. I-XX, 1-415.

Cadambi, et al., "Managing Pipeline-reconfigurable FPGAs," ACM, 1998, pp. 55-64.

Callahan, et al., "The Garp Architecture and C Compiler," Computer, Apr. 2000, pp. 62-69.

Cardoso, J.M.P. "Compilation of Java™ Algorithms onto Reconfigurable Computing Systems with Exploitation of Operation-Level Parallelism," Ph.D. Thesis, Universidade Tecnica de Lisboa (UTL), Lisbon, Portugal Oct. 2000 (Table of Contents and *English Abstract only*).

Chen et al., "A reconfigurable multiprocessor IC for rapid prototyping of algorithmic-specific high-speed DSP data paths," IEEE Journal of Solid-State Circuits, vol. 27, No. 12, Dec. 1992, pp. 1895-1904.

DeHon, A., "DPGA Utilization and Application," MIT Artificial Intelligence Laboratory, Proceedings of the Fourth International ACM Symposium on Field-Programmable Gate Arrays (FPGA '96), IEEE Computer Society, pp. 1-7.

Diniz, P., et al., "Automatic Synthesis of Data Storage and Control Structures for FPGA-based Computing Engines," 2000, IEEE, pp. 91-100.

Dutt, et al., "If Software is King for Systems-in-Silicon, What's New in Compiler?," IEEE, 1997, pp. 322-325.

Ferrante, J. et al., "The Program Dependence Graph and its Use in Optimization ACM Transactions on Programming Languages and Systems," Jul. 1987, USA, [online] Bd. 9, Nr., 3, pp. 319-349, XP002156651 ISSN: 0164-0935 ACM Digital Library.

Fineberg, S, et al., "Experimental Analysis of a Mixed-Mode Parallel Architecture Using Bitonic Sequence Sorting," Journal of Parallel and Distributed Computing, vol. 11, No. 3, Mar. 1991, pp. 239-251.

Fornaciari, et al., System-level power evaluation metrics, 1997 Proceedings of the $2^{nd}$ Annual IEEE International Conference on Innovative Systems in Silicon, New York, NY, Oct. 1997, pp. 323-330.

Forstner, "Wer Zuerst Kommt, Mahlt Zuerst!: Teil 3: Einsatzgebiete und Anwendungbeispiele von FIFO-Speichem," Elektronik, Aug. 2000, pp. 104-109, (no translation).

Gokhale, M.B. et al., "Automatic Allocation of Arrays to Memories in FPGA processors with Multiple Memory Banks," Field-Programmable Custom Computing Machines, 1999, IEEE, pp. 63-67.

Hammes, Jeff et al., "Cameron: High Level Language Compilation for Reconfigurable Systems," Department of Computer Science, Colorado State University, Conference on Parallel Architectures and Compilation Techniques, Oct. 12-16, 1999, 9 pages.

Hartenstein, R., "Coarse grain reconfigurable architectures," Design Automation Conference, 2001, Proceedings of the ASP-DAC 2001 Asia and South Pacific, Jan. 30-Feb. 2, 2001, IEEE Jan. 30, 2001, pp. 564-569.

Hastie et al., "The implementation of hardware subroutines on field programmable gate arrays," Custom Integrated Circuits Conference, 1990, Proceedings of the IEEE 1990, May 16, 1990, pp. 31.3.1-31.4.3 (3 pages).

Hauck, "The Roles of FPGAs in Reprogrammable Systems," IEEE, Apr. 1998, pp. 615-638.

Hedge, S.J., "3D WASP Devices for On-line Signal and Data Processing," 1994, International Conference on Wafer Scale Integration, pp. 11-21.

Hwang, L. et al., "Min-cut Replication in Partitioned Networks," IEEE Transactions on Computer-Aided Design of Integrated Circuits and Systems, [online] Bd. 14, Nr. 1, Jan. 1995, pp. 96-106, XP00053228 USA ISSN: 0278-0070 IEEE Xplore.

Iseli, C.,et al. "A C++ Compiler for FPGA Custom Execution Units Synthesis," IEEE, 1995, pp. 173-179.

Isshiki, Tsuyoshi, et al., "Bit-Serial Pipeline Synthesis for Multi-FPGA Systems with C++ Design Capture," 1996 IEEE, pp. 38-47.

Jacob, J., et al., "Memory Interfacing and Instruction Specification for Reconfigurable Processors," ACM 1999, pp. 145-154.

Jantsch, Axel et al., "A Case Study on Hardware/Software Partitioning," Royal Institute of Technology, Kista, Sweden, Apr. 10, 1994, IEEE, pp. 111-118.

John, L., et al., "A Dynamically Reconfigurable Interconnect for Array Processors," vol. 6, No. 1, Mar. 1998, IEEE, pp. 150-157.

Kastrup, B., "Automatic Hardware Synthesis for a Hybrid Reconfigurable CPU Featuring Philips CPLDs," Proceedings of the PACT Workshop on Reconfigurable Computing, 1998, pp. 5-10.

Koren et al., "A data-driven VLSI array for arbitrary algorithms," IEEE Computer Society, Long Beach, CA vol. 21, No. 10, Oct. 1, 1988, pp. 30-34.

Kung, "Deadlock Avoidance for Systolic Communication," 1988 Conference Proceedings of the $15^{th}$ Annual International Symposium on Computer Architecture, May 30, 1998, pp. 252-260.

Ling, X., "WASMII: An MPLD with Data-Driven Control on a Virtual Hardware," Journal of Supercomputing, Kluwer Acdemic Publishers, Dordrecht, Netherlands, 1995, pp. 253-276.

Ling et al., "WASMII: A Multifunction Programmable Logic Device (MPLD) with Data Driven Control," The Transactions of the Institute of Electronics, Information and Communication Engineers, Apr. 25, 1994, vol. J77-D-1, Nr. 4, pp. 309-317. [This references is in Chinese, but should be comparable in content to the Ling et al. reference above].

Mano, M.M., "Digital Design," by Prentice Hall, Inc., Englewood Cliffs, New Jersey 07632, 1984, pp. 119-125, 154-161.

Maxfield,C., "Logic that Mutates While-U-Wait," EDN (Bur. Ed) (USA), EDN (European Edition), Nov. 7, 1996, Cahners Publishing, USA, pp. 137-140, 142.

Miller, M.J., et al., "High-Speed FIFOs Contend with Widely Differing Data Rates: Dual-port RAM Buffer and Dual-pointer System Provide Rapid, High-density Data Storage and Reduce Overhead," Computer Design, Sep. 1, 1985, pp. 83-86.

Mirsky, E. DeHon, "MATRIX: A Reconfigurable Computing Architecture with Configurable Instruction Distribution and Deployable Resources," Proceedings of the IEEE Symposium on FPGAs for Custom Computing Machines, 1996, pp. 157-166.

Myers, G. "Advances in Computer Architecture," Wiley-Interscience Publication, 2nd ed., John Wiley & Sons, Inc., 1978, pp. 463-494.

Nilsson, et al., "The Scalable Tree Protocol—A Cache Coherence Approaches for Large-Scale Multiprocessors," IEEE, pp. 498-506, Dec. 1992.

Norman, R.S., "Hyperchip Business Summary, The Opportunity," Jan. 31, 2000, pp. 1-3.

Piotrowski, A., "IEC-Bus, Die Funktionsweise des IEC-Bus unde seine Anwendung in Geräten und Systemen," 1987, Franzis-Verlag GmbH, München, pp. 20-25, (no translation).

Razdan et al., A High-Performance Microarchitecture with Hardware-Programmable Functional Units, Micro-27, Proceedings of the $27^{th}$ Annual International Symposium on Microarchitecture, IEEE Computer Society and Association for Computing Machinery, Nov. 30-Dec. 2, 1994, pp. 172-180.

Saleeba, M. "A Self-Contained Dynamically Reconfigurable Processor Architecture," Sixteenth Australian Computer Science Conference, ASCS-16, QLD, Australia, Feb. 1993, pp. 59-70.

Schmit, et al., Hidden Markov Modeling and Fuzzy Controllers in FPGAs, FPGAs for Custom Computing machines, 1995; Proceedings, IEEE Symposium in Napa Valley, CA, Apr. 1995, pp. 214-221.

Shirazi, et al., "Quantitative analysis of floating point arithmetic on FPGA based custom computing machines," IEEE Symposium on FPGAs for Custom Computing Machines, *IEEE Computer Society Press*, Apr. 19-21, 1995, pp. 155-162.

Siemers et al., "The .>S<puter: A Novel Micoarchitecture Mode for Execution inside Superscalar and VLIW Processors Using Reconfigurable Hardware," Australian Computer Science Communications, vol. 20, No. 4, Computer Architecture, Proceedings of the $3^{rd}$ Australian Computer Architecture Conference, Perth, John Morris, Ed., Feb. 2-3, 1998, pp. 169-178.

Simunic, et al., Source Code Optimization and Profiling of Energy Consumption in Embedded Systems, Proceedings of the $13^{th}$ International Symposium on System Synthesis, Sep. 2000, pp. 193-198.

Skokan, Z.E., "Programmable logic machine (A programmable cell array)," IEEE Journal of Solid-State Circuits, vol. 18, Issue 5, Oct. 1983, pp. 572-578.

Sueyoshi, T, "Present Status and Problems of the Reconfigurable Computing Systems Toward the Computer Evolution," Department of Artificial Intelligence, Kyushi Institute of Technology, Fukuoka, Japan; Institute of Electronics, Information and Communication Engineers, vol. 96, No. 426, IEICE Technical Report (1996), pp. 111-119 [English Abstract Only].

Tau, E., et al., "A First Generation DPGA Implementation," *FPD'95*, pp. 138-143.

The XPP White Paper, Release 2.1, PACT—A Technical Perspective, Mar. 27, 2002, pp. 1-27.

TMS320C54X DSP: CPU and Peripherals, Texas Instruments, 1996, pp. 6-26 to 6-46.

TMS320C54x DSP: Mnemonic Instruction Set, Texas Instruments, 1996, p. 4-64.

Villasenor, et al., "Configurable Computing Solutions for Automatic Target Recognition," *IEEE*, 1996 pp. 70-79.

Villasenor, et al., "Configurable Computing," *Scientific American*, vol. 276, No. 6, Jun. 1997, pp. 66-71.

Villasenor, et al., "Express Letters Video Communications Using Rapidly Reconfigurable Hardware," IEEE Transactions on Circuits and Systems for Video Technology, IEEE, Inc., NY, Dec. 1995, pp. 565-567.

Wada, et al., "A Performance Evaluation of Tree-based Coherent Distributed Shared Memory," Proceedings of the Pacific RIM Conference on Communications, Comput and Signal Processing, Victoria, May 19-21, 1993, pp. 390-393.

Weinhardt, M., "Compilation Methods for Structure-programmable Computers," dissertation, ISBN 3-89722-011-3, 1997. [Table of Contents and English Abstract Provided].

Weinhardt, Markus et al., "Pipeline Vectorization for Reconfigurable Systems," 1999, IEEE, pp. 52-62.

Weinhardt, Markus et al., "Pipeline Vectorization," IEEE Transactions on Computer-Aided Design of Integrated Circuits and Systems, vol. 20, No. 2, Feb. 2001, pp. 234-248.

Wittig, et al., "One-Chip: An FPGA Processor with Reconfigurable Logic," IEEE, 1996, pp. 126-135.

Wu, et al., "A New Cache Directory Scheme," IEEE, pp. 466-472, Jun. 1996.

Xu, H.Y. et al., "Parallel QR Factorization on a Block Data Flow Architecture," Conference Proceeding Article, Mar. 1, 1992, pp. 332-336 XPO10255276, p. 333, Abstract 2.2, 2.3, 2.4—p. 334.

XLINX, "Logic Cell Array Families: XC4000, XC4000A and XC4000H," product description, pp. 2-7, 2-9, 2-14, 2-15, 8-16, and 9-14.

Ye, Z.A. et al., "A C-Compiler for a Processor With a Reconfigurable Functional Unit," FPGA 2000 ACM/SIGNA International Symposium on Field Programmable Gate Arrays, Monterey, CA Feb. 9-11, 2000, pp. 95-100.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Yeung, A. et al., "A reconfigurable data-driven multiprocessor architecture for rapid prototyping of high throughput DSP algorithms," Dept. of Electrical Engineering and Computer Sciences, Univ. of California, Berkeley, USA, pp. 169-178, *IEEE* 1993.

Zhang, et al., Architectural Evaluation of Flexible Digital Signal Processing for Wireless Receivers, Signals, Systems and Computers, 2000; Conference Record of the Thirty-Fourth Asilomar Conference, Bd. 1, Oct. 29, 2000, pp. 78-83.

Abnous et al., "Ultra-Low-Power Domain-Specific Multimedia Processors," U.C. Berkeley, 1996 IEEE, pp. 461-470.

Albaharna, O.T. et al., "On the Viability of FPGA-Based Integrated Coprocessors," Dept. of Electrical and Electronic Engineering, Imperial College of Science, London, 1999 IEEE, pp. 206-215.

Bakkes, P.J., et al., "Mixing Fixed and Reconfigurable Logic for Array Processing," Dept. of Electrical and Electronic Engineering, University of Stellenbosch, South Africa, 1996 IEEE, pp. 118-125.

Bratt, A, "Motorola field programmable analogue arrays, present hardware and future trends," Motorola Programmable Technology Centre, Gadbrook Business Centre, Northwich, Cheshire, 1998, The Institute of Electrical Engineers, IEE. Savoy Place, London, pp. 1-5.

Cardoso, J.M.P. et al., "A novel algorithm combining temporal partitioning and sharing of functional units," University of Algarve, Faro, Portugal, 2001 IEEE, pp. 1-10.

Cardoso, Joao M.P. and Markus Weinhardt, "XPP-VC: A C Compiler with Temporal Partitioning for the PACT-XPP Architecture," Field-Programmable Logic and Applications. Reconfigurable Computing is Going Mainstream, 12th International Conference FPL 2002, Proceedings (Lecture Notes in Computer Science, vol. 2438) Springer-Verlag Berlin, Germany, 2002, pp. 864-874.

Compton, K. et al., "Configurable Computing: A Survey of Systems and Software," Northwestern University, Dept. of ECE, Technical Report, 1999, (XP-002315148), 39 pages.

Diniz, P., et al., "A behavioral synthesis estimation interface for configurable computing," University of Southern California, Marina Del Rey, CA, 2001 IEEE, pp. 1-2.

Franklin, Manoj et al., "A Fill-Unit Approach to Multiple Instruction Issue," Proceedings of the Annual International Symposium on Microarchitecture, Nov. 1994, pp. 162-171.

Hwang, K., "Advanced Computer Architecture—Parallelism, Scalability, Programmability," 1993, McGraw-Hill, Inc., pp. 348-355.

"Scheme to bypass cache for big, one time reads" IBM Technical Disclosure Bulletin, IBM Corp., New York, XP000424878, Bd. 36, Nr. 11, Nov. 1, 1993, pp. 335-336.

Kaul, M., et al., "An automated temporal partitioning and loop fission approach of FPGA based reconfigurable synthesis of DSP applications," University of Cincinnati, Cincinnati, OH, ACM 1999, pp. 616-622.

Knittel, Gunter, "A PCI-compatible FPGA-Coprocessor for 2D/3D Image Processing," University of Turgingen, Germany, 1996 IEEE, pp. 136-145.

Lee et al., "A new distribution network based on controlled switching elements and its applications," IEEE/ACT Trans. of Networking, vol. 3, No. 1, pp. 70-81, Feb. 1995.

Lee, Jong-eun et al., "Reconfigurable ALU Array Architecture with Conditional Execution," International Soc. Design Conference (ISOOC) [online] Oct. 25, 2004, Seoul, Korea, 5 pages.

Margolus, N., "An FPGA architecture for DRAM-based systolic computations," Boston University Center for Computational Science and MIT Artificial Intelligence Laboratory, IEEE 1997, pp. 2-11.

Ozawa, Motokazu et al., "A Cascade ALU Architecture for Asynchronous Super-Scalar Processors," IEICE Transactions on Electronics, Electronics Society, Tokyo, Japan, vol. E84-C, No. 2, Feb. 2001, pp. 229-237.

Quenot, G.M., et al., "A Reconfigurable Compute Engine for Real-Time Vision Automata Prototyping," Laboratoire Systeme de Perception, DGA/Etablissement Technique Central de l'Armement, France, 1994 IEEE, pp. 91-100.

Schmidt, H. et al., "Behavioral synthesis for FPGA-based computing," Carnegie Mellon University, Pittsburgh, PA, 1994 IEEE, pp. 125-132.

Sutton et al., "A Multiprocessor DSP System Using PADDI-2," U.C. Berkeley, 1998 ACM, pp. 62-65.

Tsutsui, A., et al., "YARDS: FPGA/MPU Hybrid Architecture for Telecommunication Data Processing," NTT Optical Network Systems Laboratories, Japan, 1997 ACM, pp. 93-99.

Xilinx, "Spartan and SpartanXL Families Field Programmable Gate Arrays," Jan. 1999, Xilinx, pp. 4-3 through 4-70.

Yeung, A. et al., "A data-driven architecture for rapid prototyping of high throughput DSP algorithms," Dept. of Electrical Engineering and Computer Sciences, Univ. of California, Berkeley, USA, *Proceedings VLSI Signal Processing Workshop, IEEE Press*, pp. 225-234, Napa, Oct. 1992.

Zhang, et al., "A 1-V Heterogeneous Reconfigurable DSP IC for Wireless Baseband Digital Signal Processing," IEEE Journal of Solid-State Circuits, vol. 35, No. 11, Nov. 2000, pp. 1697-1704.

Zhang et al., "Abstract: Low-Power Heterogeneous Reconfigurable Digital Signal Processors with Energy-Efficient Interconnect Network," U.C. Berkeley, pp. 1-120.

Asari, et al., "FeRAM circuit technology for system on a chip," *Proceedings First NASA/DoD Workshop on Evolvable Hardware*, pp. 193-197 (1999).

Lee, et al., "Multimedia extensions for general-purpose processors," *IEEE Workshop on Signal Processing Systems, SIPS 97—Design and Implementation*, pp. 9-23 (1997).

Pirsch, et al., "VLSI implementations of image and video multimedia processing systems," *IEEE Transactions on Circuits and Systems for Video Technology* 8(7): 878-891 (Nov. 1998).

Salefski, et al., "Re-configurable computing in wireless," *Annual ACM IEEE Design Automation Conference: Proceedings of the 38th conference on Design automation*, pp. 178-183 (2001).

Schmidt, et al., "Datawave: A Single-Chip Multiprocessor for Video Applications," *IEEE Micro* 11(3): 22-25 and 88-94 (Jun. 1991).

U.S. Appl. No. 60/109,417, filed Nov. 18, 1998, Jefferson et al.

Altera, "Flex 8000 Programmable Logic Device Family," Altera Corporation product description, Jan. 2003, pp. 1-62.

Altera, "Flex 10K Embedded Programmable Logic Device Family," Altera Corporation product description, Jan. 2003, pp. 1-128.

Athanas et al., "Processor Reconfiguration Through Instruction-Set Metamorphosis," 1993, IEEE Computers, pp. 11-18.

Atmel, 5-K-50K Gates Coprocessor FPGA with Free Ram, Data Sheet, Jul. 2006, 55 pages.

Atmel, FPGA-based FIR Filter Application Note, Sep. 1999, 10 pages.

Atmel, "An Introduction to DSP Applications using the AT40K FPGA," FPGA Application Engineering, San Jose, CA, Apr. 2004, 15 pages.

Atmel, Configurable Logic Design & Application Book, Atmel Corporation, 1995, pp. 2-19 through 2-25.

Atmel, Field Programmable Gate Array Configuration Guide, AT6000 Series Configuration Data Sheet, Sep. 1999, pp. 1-20.

Bacon, D. et al., "Compiler Transformations for High-Performance Computing," ACM Computing Surveys, 26(4):325-420 (1994).

Becker, J. et al., "Architecture, Memory and Interface Technology Integration of an Industrial/Academic Configurable System-on-Chip (CSoC)," IEEE Computer Society Annual Workshop on VLSI (WVLSI 2003), (Feb. 2003).

Becker, J., "Configurable Systems-on-Chip (CSoC)," (Invited Tutorial), Proc. of 9th Proc. of XV Brazilian Symposium on Integrated Circuit, Design (SBCCI 2002), (Sep. 2002).

Becker et al., "Automatic Parallelism Exploitation for FPL-Based Accelerators." 1998, Proc. 31st Annual Hawaii International Conference on System Sciences, pp. 169-178.

Cardoso, J.M.P. et al., "Compilation and Temporal Partitioning for a Coarse-Grain Reconfigurable Architecture," Lysacht, P. & Rosentiel, W. eds., "New Algorithms, Architectures and Applications for Reconfigurable Computing," (2005) pp. 105-115.

Cardoso, J.M.P. et al., "Macro-Based Hardware Compilation of Java™ Bytecodes into a Dynamic Reconfigurable Computing System," Field-Programmable Custom Computing Machines (1999) FCCM '99. Proceedings. Seventh Annual IEEE Symposium on Napa Valley, CA, USA, Apr. 21-23, 1999, IEEE Comput. Soc, US, (Apr. 21, 1999) pp. 2-11.

Clearspeed, CSX Processor Architecture, Whitepaper, PN-1110-0702, 2007, pp. 1-15, www.clearspeed.com.

Clearspeed, CSX Processor Architecture, Whitepaper, PN-1110-0306, 2006, pp. 1-14, www.clearspeed.com.

Cook, Jeffrey J., "The Amalgam Compiler Infrastructure," Thesis at the University of Illinois at Urbana-Champaign (2004) Chapter 7 & Appendix G.

Cronquist, D. et al., Architecture Design of Reconfigurable Pipelined Datapaths, Department of Computer Science and Engineering, University of Washington, Seattle, WA, Proceedings of the 20th Anniversary Conference on Advanced Research in VSLI, 1999, pp. 1-15.

DeHon, Andre, "Reconfigurable Architectures for General-Purpose Computing," Massachusetts Institute of Technology, Technical Report AITR-1586, Oct. 1996, XP002445054, Cambridge, MA, pp. 1-353.

Ebeling, C. et al., "Mapping Applications to the RaPiD Configurable Architecture," Department of Computer Science and Engineering, University of Washington, Seattle, WA, *FPGAs for Custom Computing Machines, 1997. Proceedings., The 5th Annual IEEE Symposium*, Publication Date: Apr. 16-18, 1997, 10 pages.

Equator, Pixels to Packets, Enabling Multi-Format High Definition Video, Equator Technologies BSP-15 Product Brief, www.equator.com, 2001, 4 pages.

Fawcett, B.K., "Map, Place and Route: The Key to High-Density PLD Implementation," Wescon Conference, IEEE Center (Nov. 7, 1995) pp. 292-297.

Freescale Slide Presentation, An Introduction to Motorola's RFC (Reconfigurable Compute Fabric) Technology, Presented by Frank David, Launched by Freescale Semiconductor, Inc., 2004, 39 pages.

Genius, D. et al., "A Case for Array Merging in Memory Hierarchies," Proceedings of the 9th International Workshop on Compilers for Parallel Computers, CPC'01 (Jun. 2001), 10 pages.

Hartenstein, R. et al., "A new FPGA architecture for word-oriented datapaths," Proc. FPL'94, Springer LNCS, Sep. 1994, pp. 144-155.

Hendrich, N., et al., "Silicon Compilation and Rapid Prototyping of Microprogrammed VLSI-Circuits with MIMOLA and SOLO 1400," Microprocessing & Microprogramming (Sep. 1992) vol. 35(1-5), pp. 287-294.

Hwang, K., "Computer Architecture and Parallel Processing," Data Flow Computers and VLSI Computations, XP-002418655, 1985 McGraw-Hill, Chapter 10, pp. 732-807.

IBM Technical Disclosure Bulletin, IBM Corp., New York, XP000424878, Bd. 36, Nr. 11, Nov. 1 1993, pp. 335-336.

Inside DSP, "Ambric Discloses Massively Parallel Architecture," Aug. 23, 2006, HTTP://insidedsp.com/tabid/64/articleType/ArticleView/articleId/155/Defa..., 2 pages.

Intel, Intel MXP5800/MXP5400 Digital Media Processors, Architecture Overview, Jun. 2004, Revision, 2.4, pp. 1-14.

Kean, T.A., "Configurable Logic: A Dynamically Programmable Cellular Architecture and its VLSI Implementation," University of Edinburgh (Dissertation) 1988, pp. 1-286.

Kean, T., et al., "A Fast Constant Coefficient Multiplier for the XC6200," Xilinx, Inc., Lecture Notes in Computer Science, vol. 1142, Proceedings of the 6th International Workshop of Field-Programmable Logic, 1996, 7 pages.

Kim et al., "A Reconfigurable Multifunction Computing Cache Architecture," IEEE Transactions on Very Large Scale Integration (VLSI) Systems vol. 9, Issue 4, Aug. 2001 pp. 509-523.

Koch, Andreas et al., "High-Level-Language Compilation for Reconfigurable Computers," Proceedings of European Workshop on Reconfigurable Communication-Centric SOCS (Jun. 2005) 8 pages.

Larsen, S. et al., "Increasing and Detecting Memory Address Congruence," Proceedings of the 2002 IEEE International Conference on Parallel Architectures and Compilation Techniques (PACT02), pp. 1-12 (Sep. 2002).

Mei, Bingfeng, "A Coarse-Grained Reconfigurable Architecture Template and Its Compilation Techniques," Katholeike Universiteit Leuven, PhD Thesis, Jan. 2005, IMEC vzw, Unversitair Micro-Electronica Centrum, Belgium, pp. 1-195 (and Table of Contents).

Mei, Bingfeng, et al., "Design and Optimization of Dynamically Reconfigurable Embedded Systems," IMEC vzw, 2003, Belgium, 7 pages, http://www.imec.be/reconfigurable/pdf/ICERSA_01_design.pdf.

Miyamori, T. et al., "REMARC: Reconfigurable Multimedia Array Coprocessor," Computer Systems Laboratory, Stanford University, IEICE Transactions on Information and Systems E Series D, 1999; (abstract): Proceedings of the 1998 ACM/SIGDA sixth international symposium on Field programmable gate arrays, p. 261, Feb. 22-25, 1998, Monterey, California, United States, pp. 1-12.

Moraes, F., et al., "A Physical Synthesis Design Flow Based on Virtual Components," XV Conference on Design of Circuits and Integrated Systems (Nov. 2000) 6 pages.

Muchnick, S., "Advanced Compiler Design and Implementation" (Morgan Kaufmann 1997), Table of Contents, 11 pages.

Murphy, C., "Virtual Hardware Using Dynamic Reconfigurable Field Programmable Gate Arrays," Engineering Development Centre, Liverpool John Moores University, UK, GERI Annual Research Symposium 2005, 8 pages.

Nageldinger, U., "Design-Space Exploration for Coarse Grained Reconfigurable Architectures," (Dissertation) Universitaet Kaiserslautern, 2000, Chapter 2, pp. 19-45.

Neumann, T., et al., "A Generic Library for Adaptive Computing Environments," Field Programmable Logic and Applications, 11th International Conference, FPL 2001, Proceedings (Lecture Notes in Computer Science, vol. 2147) (2001) pp. 503-512.

Olukotun, K., "The Case for a Single-Chip Microprocessor," ACM Sigplan Notices, ACM, Association for Computing Machinery, New York, vol. 31, No. 9, Sep. 1996 pp. 2-11.

PACT Corporation, "The XPP Communication System," Technical Report 15 (2000), pp. 1-16.

Parhami, B., "Parallel Counters for Signed Binary Signals," Signals, Systems and Computers, 1989, Twenty-Third Asilomar Conference, vol. 1, pp. 513-516.

Saleeba, Z.M.G., "A Self-Reconfiguring Computer System," Department of Computer Science, Monash University (Dissertation) 1998, pp. 1-306.

Schönfeld, M., et al., "The LISA Design Environment for the Synthesis of Array Processors Including Memories for the Data Transfer and Fault Tolerance by Reconfiguration and Coding Techniques," J. VLSI Signal Processing Systems for Signal, Image, and Video Technology, (Oct. 1, 1995) vol. 11(1/2), pp. 51-74.

Shin, D., et al., "C-based Interactive RTL Design Methodology," Technical Report CECS-03-42 (Dec. 2003) pp. 1-16.

Singh, H. et al., "MorphoSys: An Integrated Reconfigurable System for Data-Parallel Computation-Intensive Applications," University of California, Irvine, CA. and Federal University of Rio de Janeiro, Brazil, 2000, IEEE Transactions on Computers, pp. 1-35.

Sondervan, J., "Retiming and logic synthesis," Electronic Engineering (Jan. 1993) vol. 65(793), pp. 33, 35-36.

Soni, M., "VLSI Implementation of a Wormhole Run-time Reconfigurable Processor," Jun. 2001, (Masters Thesis)Virginia Polytechnic Institute and State University, 88 pages.

Vasell et al., "The Function Processor: A Data-Driven Processor Array for Irregular Computations," Chalmers University of Technology, Sweden, pp. 1-21.

Waingold, E., et al., "Baring it all to software: Raw machines," IEEE Computer, Sep. 1997, at 86-93.

Weinhardt, Markus et al., "Memory Access Optimization for Reconfigurable Systems," IEEE Proceedings Computers and Digital Techniques, 48(3) (May 2001) pp. 1-16.

Wolfe, M. et al., "High Performance Compilers for Parallel Computing" (Addison-Wesley 1996) Table of Contents, 11 pages.

Xilinx, "XC6200 Field Programmable Gate Arrays," Apr. 24, 1997, Xilinx product description, pp. 1-73.

Xilinx, "XC3000 Series Field Programmable Gate Arrays," Nov. 6, 1998, Xilinx product description, pp. 1-76.

Xilinx, "XC4000E and XC4000X Series Field Programmable Gate Arrays," May 14, 1999, Xilinx product description, pp. 1-68.

Xilinx, "Virtex-E 1.8 V Extended Memory Field Programmable Gate Arrays," Jul. 17, 2002, Xilinx Production Product Specification, pp. 1-118.

Xilinx, "Virtex-II and Virtex-II Pro X FPGA User Guide," Mar. 28, 2007, Xilinx user guide, pp. 1-559.

Zima, H. et al., "Supercompilers for parallel and vector computers" (Addison-Wesley 1991) Table of Contents, 5 pages.

Advanced RISC Machines, "Introduction to AMBA," Section 1, pp. 1-1 to 1-7 (Oct. 1996).

ARM, "The Architecture for the Digital World," http://www.arm.com/products, 3 pages (Mar. 18, 2009).

ARM, "The Architecture for the Digital World; Milestones," http://www.arm.com/aboutarm/milestones.html, 5 pages (Mar. 18, 2009).

Del Corso, et al., "Microcomputer Buses and Links," Academic Press Inc. Ltd., pp. 138-143, 277-285 (1986).

"IEEE Standard Test Access Port and Boundary-Scan Architecture," IEEE Std. 1149.1-1990, pp. 1-127 (1993).

PCI Local Bus Specification, Production Version, Revision 2.1, Portland, OR, pp. 1-281 (Jun. 1, 1995).

"The Programmable Logic Data Book," Xilinx, Inc., Section 2, pp. 1-240, Section 8, pp. 1, 23-25, 29, 45-52, 169-172 (1994).

* cited by examiner

PARALLEL TASK OPERATION IN PROCESSOR AND RECONFIGURABLE COPROCESSOR CONFIGURED BASED ON INFORMATION IN LINK LIST INCLUDING TERMINATION INFORMATION FOR SYNCHRONIZATION

FIELD OF THE INVENTION

The present invention relates to reconfigurable processors. In particular, the present invention addresses connecting a reconfigurable processor to a standard processor in a particularly favorable manner.

BACKGROUND INFORMATION

A reconfigurable architecture is understood in the present case to be modules (VPUs) having a configurable function and/or interconnection, in particular integrated modules having a plurality of arithmetic and/or logic and/or analog and/or memory and/or internal/external interconnecting units that are configured in one or more dimensions and are interconnected directly or via a bus system.

Generic modules of this type include in particular systolic arrays, neural networks, multiprocessor systems, processors having a plurality of arithmetic units and/or logic cells and/or communicative/peripheral cells (IO), interconnecting and networking modules such as crossbar switches as well as conventional modules of the generic types FPGA, DPGA, Chameleon, XPUTER, etc. Reference is made in this context in particular to the following protective rights of the present applicant: P 44 16 881.0-53, DE 197 81 412.3, DE 197 81 483.2, DE 196 54 846.2-53, DE 196 54 593.5-53, DE 197 04 044.6-53, DE 198 80 129.7, DE 198 61 088.2-53, DE 199 80 312.9, PCT/DE 00/01869, DE 100 36 627.9-33, DE 100 28 397.7, DE 101 10 530.4, DE 101 11 014.6, PCT/EP 00/10516, EP 01 102 674.7, DE 196 51 075.9-53, DE 196 54 846.2-53, DE 196 54 593.5-53, DE 197 04 728.9, DE 198 07 872.2, DE 101 39 170.6, DE 199 26 538.0, DE 101 42 904.5, DE 101 10 530.4, DE 102 02 044.2, DE 102 06 857.7, DE 101 35 210.7-53, EP 02 001 331.4, 60/317,876. These are herewith incorporated to the full extent for disclosure purposes.

The aforementioned architecture is used as an example for illustration and is referred to below as VPU. This architecture is composed of any arithmetic cells, logic cells (including memories) and/or memory cells and/or networking cells and/or communicative/peripheral (IO) cells (PAEs) which may be arranged to form a one-dimensional or multidimensional matrix (PAC), the matrix optionally having different cells of any type; bus systems are also understood to be cells here. The matrix as a whole or parts thereof are assigned a configuration unit (CT) which influences the interconnection and function of the PA.

SUMMARY

A reconfigurable processor (VPU) is designed into a technical environment having a standard processor (CPU) such as a DSP, RISC or CISC processor or a (micro)controller. This design permits the simplest possible connection, which is nevertheless very efficient. Another feature is the simple programming of the resulting system. Continued use of existing programs of the CPU and code compatibility and simple integration of the VPU into existing programs with no problem are taken into account by the method described here.

Reconfigurable modules (VPUs) of different generic types (such as PACT XPP technology, Morphics, Morphosys, Chameleon) are generally incompatible with existing technical environments and programming methods.

The programs of the modules are also incompatible with pre-existing CPU programs. This necessitates enormous developing effort in programming, e.g., in particular for modules of the generic Morphics and Morphosys types. Chameleon already has a standard processor (ARC) integrated into the reconfigurable modules. Thus, the tools for programming are available. However, not all technical environments are suitable for use of ARC processors, and in particular existing programs, code libraries, etc. are often provided for any indeterminate other CPUs.

In accordance with the present invention, VPU (or a plurality of VPUs, without having to mention this specifically each time) is connected to a preferred CPU in such a way that it assumes the position and function of a coprocessor. The function as coprocessor permits the simple tie-in to existing program codes according to the pre-existing methods for handling coprocessors according to the related art.

This system may be designed in particular as a (standard) processor or unit and/or integrated into a semiconductor (system on chip, SoC).

In order to provide the coprocessor link between the CPU and the VPU, an exchange of data, i.e., information between the CPU and VPU, is necessary. In particular, the processor must typically relay data and instructions about what must be done to the data. The data exchange between the CPU and VPU may take place via memory linkage and/or IO linkage. The CPU and VPU may in principle share all the resources. In particular embodiments, however, it is also possible for the CPU and VPU to jointly use only some of the resources, while other resources are available explicitly and exclusively for the CPU or the VPU. The question of which variant is preferred will typically depend on, among other things, the overall layout of the system, the possible cost, available resources and the expected data load. It should be pointed out that whenever reference is made to a single CPU, this may also be understood to refer to a plurality of CPUs together.

To perform a data exchange, data records and/or configurations may be copied and/or written/read in memory areas provided specifically for this purpose and/or corresponding basic addresses may be set so that they point to the particular data ranges.

In one preferred variant, for controlling the coprocessor, a data record containing the basic settings of a VPU such as, for example, certain basic addresses, is provided. In addition, status variables may also be provided in the data record for triggering and function control of a VPU by a CPU and/or for separate transmission and may be exchanged with or separately from data. In a particularly preferred variant, the addresses may be flexibly distributed and allocated. Thus preferably only one basic address in the I/O address space or the memory address space need be fixedly agreed upon to be used with its data record as a pointer to the flexibly defined addresses.

The data record may be exchanged via a common memory (RAM) and/or a common peripheral address base (IO). The addresses may be flexibly distributed and allocated.

For synchronization of the CPU and VPU, unidirectional or mutual interrupt methods (e.g., interrupt lines) may be provided and/or synchronization may be performed via polling methods. In addition, interrupts may also be used for synchronizing data transfers and/or DMA transfers. In one embodiment that is particularly preferred, a VPU is started by a CPU and then independently thereof it runs the application which has been started, i.e., instructed.

A preferred structure in which the VPU used provides its own mechanisms for loading and controlling configurations is particularly efficient. For example, PACT XPP and Chameleon belong to the generic type of these VPUs. The circuits according to the present invention permit a method for operation so that some or all configurations of the VPU together with the program of the CPU to be executed are loaded into a memory. During execution of the program, the CPU may refer to the memory locations (e.g., via addresses or pointers), each containing the particular configurations to be executed. The VPU may then automatically load the configurations without any further influence by the CPU. If and to the extent that the VPU, i.e., the reconfigurable field having particularly coarse-grained runtime-configurable elements, has a load logic for loading configurations, it may be sufficient if the processor issues instructions to the VPU to load a certain configuration. The call to the reconfigurable processor, which then functions as the coprocessor, may thus preferably be issued via a single instruction to the load logic. It should be pointed out that by prior agreement between the VPU and CPU, i.e., the calling host processor, it is possible to stipulate precisely which configuration is to be executed by which call. It should be pointed out here that suitable control means may be provided in the load logic unit, whether dedicated, implemented or formed by one or more reconfigurable cells of the reconfigurable processor. Execution begins immediately or, if necessary, is begun via additional information (e.g., interrupt and/or start instructions) by the CPU.

In a particularly preferred further embodiment, the VPU is able to independently read and write data within one or more memories, some of which may be shared with or independent of the CPU.

In a particularly preferred further embodiment, the VPU may also independently load new configurations out of the memory and reconfigure them as needed without requiring any additional influence by the CPU.

These embodiments permit operation of VPUs mostly independently of CPUs. Only synchronization exchange between the CPU and VPU, which is preferably bidirectional, should additionally be provided to coordinate the data processing and/or configuration execution sequences.

The sequence control of a VPU may be accomplished directly by a program executed on the CPU, which more or less constitutes the main program which swaps out certain subprograms to the VPU. This variant is particularly easy to implement.

However, mechanisms controlled via the operating system (in particular the scheduler) are preferably used for synchronization and sequence control. Whenever possible, a simple scheduler in particular may perform the following after transfer of the function to the VPU:

1. allow the current main program to continue running on the CPU if it is able to run independently on a VPU and simultaneously with data processing; additionally and/or alternatively,
2. if or as soon as the main program must wait for the end of data processing on the VPU, the task scheduler switches to another task (e.g., another main program). The VPU may continue working in the background regardless of the CPU task currently at hand.

Each newly activated task will typically (if it uses the VPU) check before use to determine whether it is available for data processing or whether it is currently still processing data in a manner which blocks the required VPU resources. It is then necessary to wait either for the end of data processing or, if preferable according to priority, for example, the task must be changed.

A simple and nevertheless efficient method may be created and/or implemented in particular on the basis of so-called descriptor tables which may be implemented as follows, for example:

For calling the VPU, each task generates one or more tables (VPUPROC) having a suitable defined data format in the memory area assigned to it. This table includes all the control information for a VPU, e.g., the program/configuration to be executed (or pointers to the corresponding memory locations) and/or memory location(s) (or pointers to each) and/or data sources (or pointers thereto) for the input data and/or the memory location(s) (or pointers thereto) for the operand or the result data.

For example, a table or a chained list (LINKLIST) may be found in the memory area of the operating system, pointing to all VPUPROC tables in the order in which they are created and/or called.

Data processing on the VPU is preferably performed so that a main program creates a VPUPROC and calls the VPU via the operating system. The operating system creates an entry in the LINKLIST. The VPU processes the LINKLIST and executes the particular VPUPROC referenced. The end of a particular data processing is preferably indicated by a corresponding entry in the LINKLIST and/or VPUCALL table which the VPU may query by regular polling, for example. As an alternative, interrupts may be used as an indicator from the VPU to the CPU and if necessary may also be used for exchanging the VPU status. It is not only possible here to indicate the fact that the end of the program has been reached but it is also possible to indicate the fact that a point in the subprogram has already been reached, and if so, which point.

In this method, which is preferred according to the present invention, the VPU works largely independently of the CPU. In particular, the CPU and the VPU may perform independent and different tasks per unit of time. The operating system and/or the particular tasks need only monitor the tables (LINKLIST and/or VPUPROC).

As an alternative, LINKLIST may also be omitted by chaining the VPUPROCs to one another using pointers, as is known from lists, for example. VPUPROCs that have been processed are removed from the list and new ones are inserted. Programmers are familiar with this method which therefore need not be explained in greater detail here.

DETAILED DESCRIPTION OF EXAMPLE EMBODIMENTS

Figure 1:
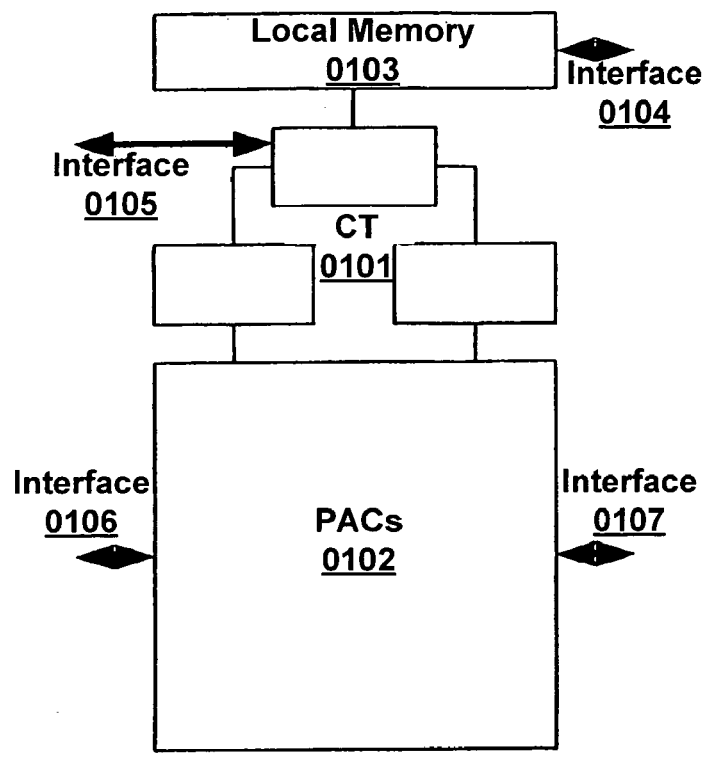
FIG. 1 shows an example VPU.

FIG. 1 shows a particularly preferred VPU design. Configuration managers (CTs) (0101), preferably hierarchical, control and administer a system of reconfigurable elements (PACs) (0102). The CTs are assigned a local memory for configurations (0103). The memory also has an interface (0104) to a global memory which supplies the configuration data. The configuration sequences are controllable via an interface (0105). There is an interface of reconfigurable elements (0102) to sequence control and event management (0106); there is also an interface to data exchange (0107).

Figure 2:
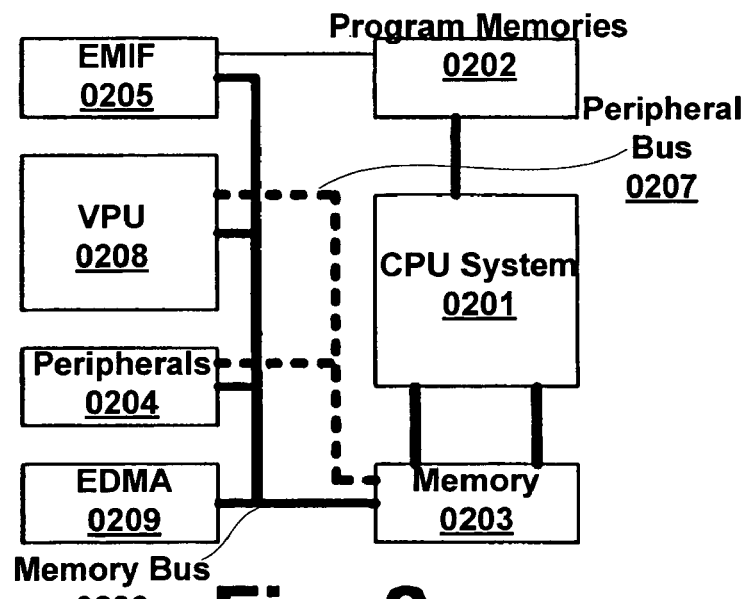
FIG. 2 shows an example CPU system.

FIG. 2 shows a detail of an exemplary CPU system, e.g., a DSP of the C6000 type from Texas Instruments or a microcontroller from ARM (0201). Program memories (0202), data memories (0203), any peripherals (0204) and an EMIF (0205) are shown. A VPU is integrated (0208) as a coprocessor via a memory bus (0206) and a peripheral bus (0207). A DMA controller (EDMA) (0209) may perform any DMA transfers, e.g., between memory (0203) and VPU (0208) or memory (0203) and peripherals (0204). The VPU and/or the CPU may also access the memory independently without the assistance of a DMA. The shared memory may be also be designed as a dual port memory or multiport memory in particular. Additional units, in particular reconfigurable FPGAs, may be assigned to the system to permit fine-grained processing of individual signals or data bits and/or to be able to establish flexible adaptable interfaces (e.g., various serial interfaces (V24, USB, etc.)), various parallel interfaces (hard drive interfaces, Ethernet, telecommunications interfaces (a/b, TO, ISDN, DSL, etc.)).

Figure 3:
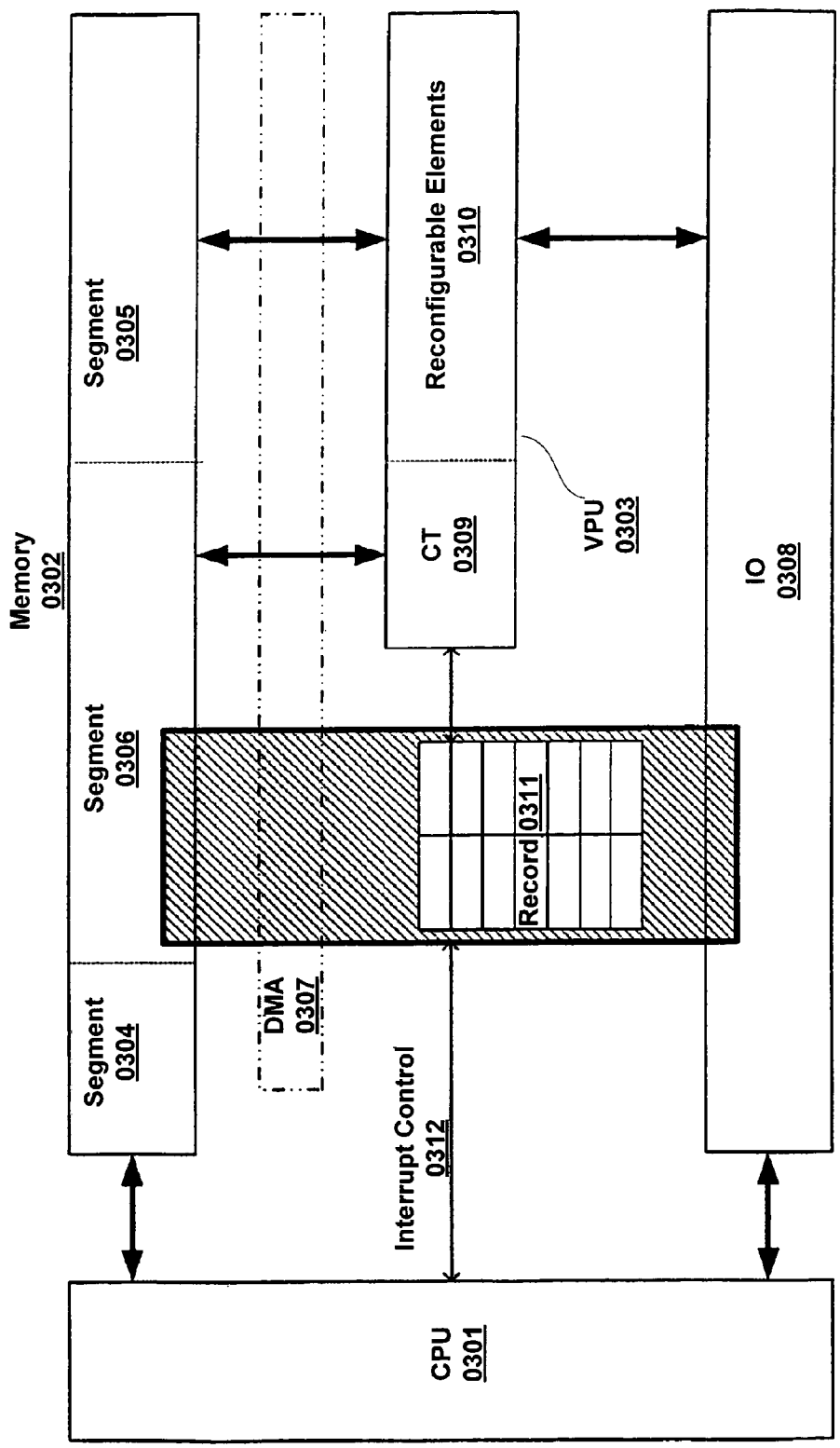
FIG. 3 shows an exemplary system.

FIG. 3 shows a more abstract system definition. A CPU (0301) is assigned a memory (0302) to which it has read and/or write access. A VPU (0303) is connected to the memory. The VPU is divided into a CT part (0309) and the reconfigurable elements for data processing (0310).

To increase memory accesses, the memory may have a plurality of independent access buses (multiport) which under some circumstances may be used simultaneously. In a particularly preferred embodiment, the memory is segmented into multiple independent segments (memory banks), each bank optionally being accessed independently. All segments are preferably within a uniform address space.

One segment is preferably available mainly for CPU (0304), another segment is available mainly for data processing by VPU (0305) and yet another segment is mainly available for the configuration data of VPU (0306).

Typically and preferably a fully embodied VPU has its own address generators and/or DMAs to perform data transfers. Alternatively and/or additionally, it is possible for a DMA (0307) to be provided inside the system (FIG. 3) for data transfers with the VPU.

The system contains IO means (0308) to which the CPU and VPU may have access.

Both the CPU and VPU may have dedicated memory areas and IO areas to which the other does not have access.

A data record (0311) which may be in the memory area and/or in the IO area and/or partially in one of the two, as shown graphically, is used for communication between the CPU and VPU, e.g., for exchange of basic parameters and control information. The data record may include the following information, for example, and thus constitutes a basic settings data record:
1. Basic address(es) of the CT memory area in 0306 for localizing the configurations,
2. Basic address(es) of data transfers with 0305,
3. I/O addresses of data transfers with 0308,
4. Synchronization information, e.g., reset, stop, starting the VPU,
5. Status information on the VPU, e.g., error or status of data processing.

The CPU and VPU are synchronized by polling status data and/or status information and/or preferably by interrupt control (0312).

The basic setting data record may contain a LINKLIST and/or VPUCALLs or alternatively may point to the LINKLIST and/or VPUCALLs or to the first entry thereof by pointers.

Figure 4:
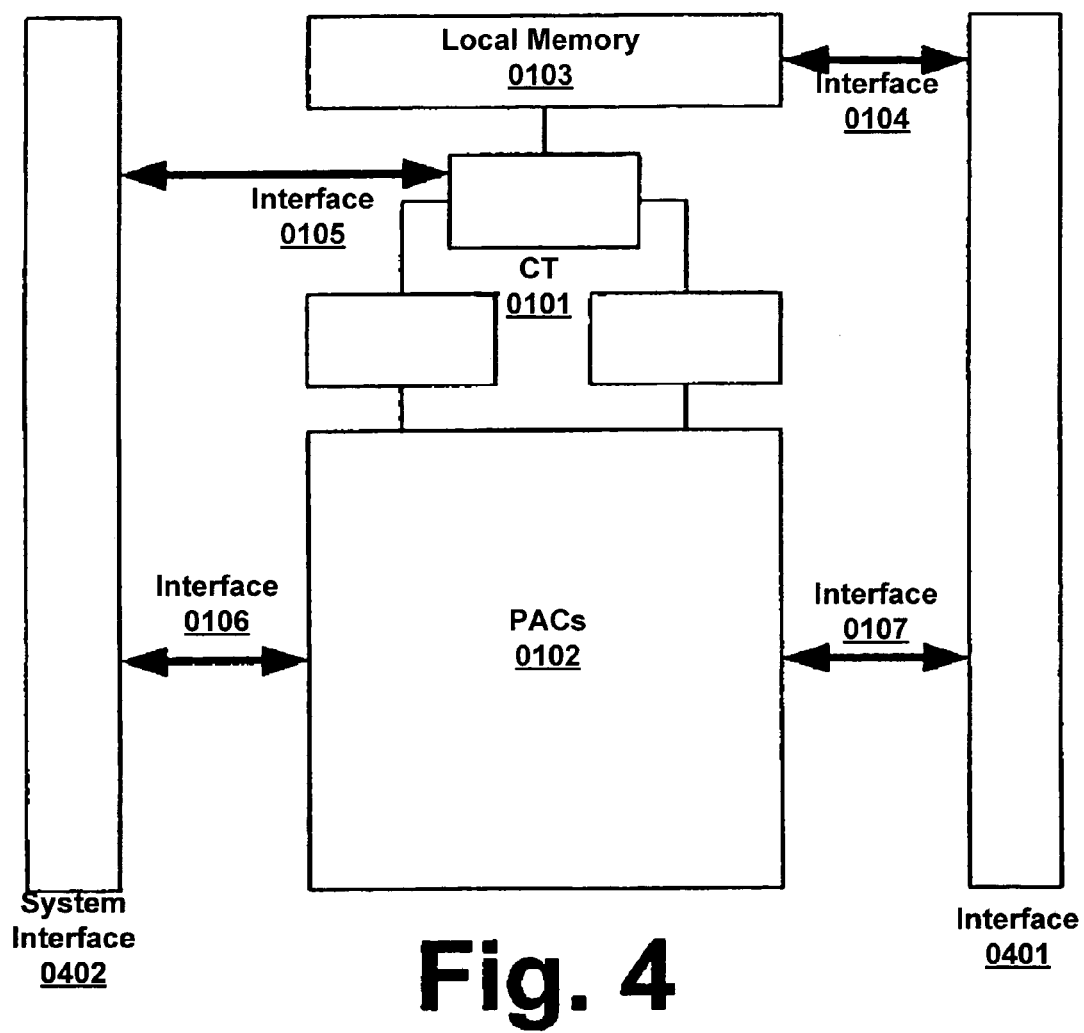
FIG. 4 shows an example interface structure.

FIG. 4 shows an example embodiment of the interface structure of a VPU for tying into a system like that in FIG. 3. The VPU here is assigned a memory/DMA interface and/or an IO interface for data transfer (0401). Another system interface (0402) takes over sequence control such as the management of interrupts, starting and stopping processing, exchange of error states, etc.

The memory/DMA interface and/or an IO interface is connected to a memory bus and/or an IO bus.

The system interface is preferably connected to an IO bus, but alternatively or additionally according to 0311 it may also be connected to a memory. Interfaces (0401, 0402) may be designed for adaptation of different working frequencies of the CPU and/or VPU and/or system and may have a clock matching circuit; for example, the system, i.e., the CPU, may operate at 400 MHz and the VPU at 200 MHz.

The interfaces may translate the bus protocols using a protocol matching circuit, e.g., the VPU-internal protocol may be converted to an external AMBA bus protocol or vice versa.

The memory/DMA interface and/or IO interface supports the memory access of the CT to an external memory which is preferably direct (memory mapped). The data transfer of the CT(s) and/or PAC(s) may be buffered, e.g., via FIFO stages. The external memory (e.g., 0308, 0203) may be addressed directly, and DMA-internal and/or external DMA transfers may be performed.

Data processing, e.g., initializing and/or startup of configurations, is controlled via the system interface. In addition, status and/or error states are exchanged. Interrupts for the control and synchronization between the CTs and a CPU may be supported.

The system interface may convert VPU-internal protocols to be implemented on external (standard) protocols (e.g., AMBA).

It should be pointed out that bus interfaces, RAM cells, I/O cells and the like may be provided as parts (PAEs) of a VPU. This is also true when these units are to be used for processor-coprocessor linkage.

A preferred method for generating code for the system described here is described in the PACT20 patent application (i.e., U.S. patent application Ser. No. 09/967,498), the full content of which is herewith incorporated for disclosure purposes. This method includes a compiler which splits the program code into a CPU code and a VPU code. The split between the different processors is performed by various methods. In one particularly preferred embodiment, the particular split codes are expanded by adding interface routines for communication between CPU and VPU. This expansion may also be performed automatically by the compiler.

The advantage according to the present invention is that management complexity and/or interface complexity as well as programming of the system according to the present invention are simple and inexpensive.

The following tables show examples of communications between a CPU and a VPU. The particular active function units are assigned to the columns (CPU, system DMA and DMA interface (EDMA), i.e., memory interface (memory IF), system interface (system IF, 0402), CTs and the PAC). The rows show the individual cycles in order of execution. K1 references configuration 1, which is to be executed.

The first table shows a sequence using the DMA (EDMA) system for data transfer as an example. Each row indicates a control process taking place sequentially. The columns show the particular activity in the corresponding module:

| CPU | EDMA | System IF | CTs | PAC |
|---|---|---|---|---|
| Initiate K1 | | | | |
| Start K1 | Load K1 | | Configure K1 | |
| Initiate Load data via EDMA | | Start K1 | | Wait for data |
| Initiate Read data via EDMA | Data transfer Read data | | | Data processing |
| | Data transfer Write data | Signal end of operation | | |

It should be pointed out that the EDMA and VPU are automatically synchronized via interface 0401, i.e., DMA transfers take place only when the VPU is ready for it.

A second table shows a preferred optimized sequence as an example. The VPU itself has direct access to configuration memory (0306). In addition, the data transfers are executed by a DMA circuit within the VPU, which may be fixedly implemented, for example (PACT03, i.e., U.S. Pat. No. 6,513,077) and/or result from the configuration of configurable parts of the PAC.

| CPU | EDMA | System IF | CTs | PAC |
|---|---|---|---|---|
| Initiate K1 | | | | |
| Start K1 | Read configuration | | Configure K1 | |
| | Data transfer Read data | Start K1 | | Read data |
| | | | | Data processing |
| | Data transfer Write data | Signal end of operation | | Write data |

The operating and synchronization complexity for the CPU is minimal, so that maximum performance is achieved.

In addition, according to this method a plurality of configurations may be executed in different areas of the VPU, i.e., in different PAEs or on the same resources by using a time multiplexing method.

In particular, a type of double buffering may be used for particularly simple and rapid reconfiguration in which a plurality of VPUs are provided, some optionally being reconfigured at a point in time of the VPUs, while others perform computations and possibly yet others may be inactive. The data connections, trigger connections, status connections, etc. are exchanged in a suitable way among the plurality of VPUs and optionally interconnected through addressed buses and/or multiplexers/demultiplexers according to the VPUs currently active and/or to be reconfigured.

The full content of all the PACT patent applications identified above as well as their family members is herewith incorporated for disclosure purposes.

Other further embodiments and combinations of the present inventions mentioned above are, of course, possible. In this regard, it should be pointed out in particular that instead of connecting a VPU to a CPU using the VPU as the coprocessor, such a connection is also possible using the CPU as the coprocessor. Such a case is preferred in particular to have instruction structures recognized as having only minor parallelism and/or minor vector components processed sequentially as program parts in compiling. It is then possible in particular for the VPU to call the CPU via linklists or tables. The linklists or tables may contain information indicating where data is to be retrieved, at which address the CPU is able to access program information to be processed by it, etc. The inquiry as to whether the CPU is then finished with processing the program parts to be executed by it may in turn be handled via polling or the like. Here again, the operating system may be used to assign tasks to the CPU and/or to monitor the tasks to be executed by it. In principle, all the methods described here may thus be used for both linking a CPU to a VPU as a coprocessor as well as the converse. The only thing that may be important here is which type of linkage the operating system is designed for. It should be pointed out that it is possible in particular to provide an operating system that permits mutual linkage, i.e., in particular, optionally the CPU to the VPU and/or parts thereof and the converse. The latter is particularly advantageous when entire program blocks having mainly sequential portions are to be delivered by the VPU as host to the CPU as coprocessor and these program blocks still have strongly vectorial or parallel code in some cases which may be more or less transmitted back by the CPU, in particular in response to a current or predicted VPU load that has been determined.

What is claimed is:

1. A method for processing data in a programmed manner, comprising:

coupling a standard processor and a reconfigurable coprocessor, the coupling forming a processor-coprocessor arrangement;

executing, by the standard processor, at least one of a program and a task of the program;

during the executing of the at least one of the program and the task of the program, the standard processor providing to the reconfigurable coprocessor configuration related information in accordance with which the reconfigurable coprocessor reads the configuration from a configuration memory and configures the read configuration onto the reconfigurable processor;

writing the configuration related information into a link list, wherein:
the configuration is determined based on the link list; and
the link list includes termination information regarding termination of the configuration;

processing data, by the reconfigurable coprocessor, in accordance with the at least one configuration;

during the data processing by the reconfigurable coprocessor, parallelly processing data by the standard processor by one of (a) continuing the executing of the at least one of the program and the task of the program and (b) executing at least one of a different program and a different task of one of the program and the different program, wherein the continuing the executing is performed if an end of the at least one of the program and the task of the program has not yet been reached and the continuing the executing is performable independent of unavailable output of the data processing by the reconfigurable coprocessor, and the executing the at least one of the different program and the different task is otherwise performed;

transferring synchronization signals between the standard processor and the reconfigurable coprocessor to synchronize the data processing by the standard processor and the data processing by the reconfigurable coprocessor; and to synchronize the data processing by the standard processor and the data processing by the reconfigurable coprocessor:
using the termination information;
providing the link list with information indicating an execution progress of the configuration that is configured onto the reconfigurable coprocessor; and
polling the link list.

2. The method of claim 1, further comprising:
determining, by a scheduler, which of the (a) continuing the execution and the (b) execution of the at least one of the different program and the different task is to be performed; and
controlling the standard processor, by the scheduler, in accordance with the determination.

3. The method of claim 2, wherein:
the determining by the scheduler includes determining whether (a) the continuing the execution is dependent on an output of the reconfigurable coprocessor and (b) the output is available to the standard processor at the moment of the determination; and
if the end of the program has not yet been reached, the scheduler controls the standard processor to execute the at least one of the different program and the different task responsive to a determination that (a) and not (b).

4. The method of claim 1, wherein the synchronization signals include an interrupt request.

5. The method of claim 1, wherein:
the standard processor is one of a digital signal processor (DSP), a micro-controller, and a central processing unit (CPU); and
the reconfigurable coprocessor includes a plurality of coarse granular runtime reconfigurable elements.

6. The method of claim 1, wherein the configuration related information includes a pointer to at least one location in the configuration memory from which the configuration is read, and a pointer to at least one memory location which stores at least one of operand and result data of the processing performed by the reconfigurable coprocessor.

7. The method of claim 1, wherein the reconfigurable coprocessor is runtime reconfigurable.

8. The method of claim 1, further comprising:
in an instance where the execution of the at least one of the program and the task of the program being executed requires the reconfigurable coprocessor as a resource, checking, by the reconfigurable coprocessor, an availability of the reconfigurable coprocessor;
wherein the at least one of the different program and the different task is selected for execution on the standard processor if the reconfigurable coprocessor is unavailable.

* * * * *